United States Patent
Zhou

(10) Patent No.: US 8,073,284 B2
(45) Date of Patent: Dec. 6, 2011

(54) THRESHOLDING GRAY-SCALE IMAGES TO PRODUCE BITONAL IMAGES

(75) Inventor: Hui Zhou, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 893 days.

(21) Appl. No.: 12/062,297

(22) Filed: Apr. 3, 2008

(65) Prior Publication Data

US 2009/0252434 A1    Oct. 8, 2009

(51) Int. Cl.
*G06K 9/38* (2006.01)

(52) U.S. Cl. ........ 382/270; 382/137; 382/173; 382/175; 382/254; 382/276; 358/3.26; 358/448; 358/462

(58) Field of Classification Search .................. None
See application file for complete search history.

(56) References Cited

U.S. PATENT DOCUMENTS

| | | |
|---|---|---|
| 4,850,029 A | 7/1989 | Moyer et al. |
| 5,268,773 A | 12/1993 | Park et al. |
| 5,903,676 A | 5/1999 | Wu et al. |
| 5,915,039 A * | 6/1999 | Lorie et al. ............ 382/230 |
| 6,393,150 B1 | 5/2002 | Lee et al. |
| 6,577,762 B1 * | 6/2003 | Seeger et al. ............ 382/173 |
| 7,062,099 B2 | 6/2006 | Li et al. |
| 7,085,401 B2 | 8/2006 | Averbuch et al. |
| 7,088,857 B2 | 8/2006 | Zuniga |
| 2006/0015262 A1 | 1/2006 | Gholap et al. |
| 2007/0211942 A1 * | 9/2007 | Curtis et al. ............ 382/181 |
| 2007/0253040 A1 * | 11/2007 | Lee et al. ............ 358/518 |
| 2007/0280551 A1 * | 12/2007 | Oztan et al. ............ 382/268 |

FOREIGN PATENT DOCUMENTS

| | | |
|---|---|---|
| EP | 0245359 | 5/1990 |
| JP | 09233326 | 9/1997 |
| JP | 2003219184 | 7/2003 |
| JP | 2006270148 | 10/2006 |

OTHER PUBLICATIONS

Chang et al., "Improved Binarization Algorithm for Document Image by Histogram and Edge Detection", 1995, IEEE, pp. 636-639.*
Sezgin et al. "Survey over image thresholding techniques and quantitative performance evaluation", 2004, Journal of Electronic Imaging 13(1), pp. 146-168.*
Kavallieratou et al. "Adaptive Binarization of Historical Document Images", 2006, IEEE ICPR'06.*
Adaptive Binarization of Historical Document Images, Ergina Kavallieratou and Stamatatos Stathis, University of the Aegean, Samos, Greece, The 18th International Conference on Pattern Recognition (ICPR '06), IEEE, Jan. 2006.
Binarization Method Based on Pixel-level Dynamic Thresholds for Change Detection in Image Sequences, Hsu-Yung Cheng, Quen-Zong Wu, Kuo-Chin Fan and Bor-Shenn Jeng, Institute of Computer Science and Information Engineering, National Central University, Taiwan, Jun. 30, 2005, (pp. 545-557).

\* cited by examiner

*Primary Examiner* — Sath V Perungavoor
*Assistant Examiner* — Jason Heidemann

(57) ABSTRACT

Thresholding gray-scale images to produce bitonal images. In one example embodiment, a method for thresholding a gray-scale image to produce a bitonal image includes several acts. First, a first portion of gray-scale pixels of the gray-scale image are thresholded based on a global threshold and edge strength information. Next, a second portion of the gray-scale pixels are thresholded based on the global threshold and local pixel information. Finally, a third portion of the gray-scale pixels are thresholded based on a local threshold.

18 Claims, 3 Drawing Sheets

THRESHOLDING GRAY-SCALE IMAGES TO PRODUCE BITONAL IMAGES

THE FIELD OF THE INVENTION

The invention relates to digital image processing. More specifically, embodiments of the invention relate to methods and computer-readable media for thresholding gray-scale images to produce bitonal images.

BACKGROUND

Gray-scale digital images include pixels that are black, white, and various shades of gray. Bitonal digital images include only pixels that are either black or white. A gray-scale digital image can be converted to a bitonal image using a process known as thresholding. Thresholding gray-scale images to produce bitonal images can be useful, for example, in separating foreground features of a check, such as handwriting and printed text, from background features of a check, such as background patterns, in order to make the foreground features of the check more readable for humans or optical character recognition (OCR) techniques.

Typical thresholding techniques generally convert each pixel of a gray-scale image to a black pixel if the intensity of the gray-scale pixel is above a threshold and convert the pixel to a white pixel otherwise. However, typical thresholding techniques may not be effective for some check images. In particular, foreground intensity levels in some check images may not differ significantly from background intensity levels due to noise or widely varying intensities in the background and/or foreground. Thus, typical thresholding techniques may produce an image of a check that does not accurately depict foreground features of the check.

SUMMARY OF EXAMPLE EMBODIMENTS

In general, example embodiments relate to methods and computer-readable media for thresholding gray-scale images to produce bitonal images.

In a first example embodiment, a method for thresholding a gray-scale image to produce a bitonal image includes several acts. First, a first portion of gray-scale pixels of the gray-scale image are thresholded based on a global threshold and edge strength information. Next, a second portion of the gray-scale pixels are thresholded based on the global threshold and local pixel information. Finally, a third portion of the gray-scale pixels are thresholded based on a local threshold.

In a second example embodiment, a method for thresholding a gray-scale image to produce a bitonal image includes several acts. First, a gray-scale image is accessed that has an original intensity function, Orig(i,j), which defines pixel intensities at every coordinate combination, (i,j), of the gray-scale image. Next, edge detection is applied to the original image intensity function, Orig(i,j), to produce an edge strength function, E(i,j). Then, a mean, Em, of the edge strength function, E(ij), is calculated. Next, gray-scale pixels whose edge strength is lower than the mean, Em, are adaptively smoothed to generate a smoothed image intensity function, Smth(i,j). Then, a global threshold, Gt, of the smoothed gray-scale image is calculated. Next, the gray-scale image is divided into a set of windows. Then, for each window in the set of windows, an intensity mean, Lm, and an intensity variance, Std, are calculated. Finally, for each image coordinate (i,j), a final pixel intensity, Fin(i,j), is determined by applying the following formulas:

```
IF Smth(i,j) > Gt AND E(i,j) < Em
    THEN set Fin(i,j) to white
ELSE IF Lm < 0.4 * Gt
    THEN set Fin(i,j) to black
ELSE IF Smth(i,j) < Lm * (Std * 0.006 + 0.8)
    THEN set Fin(i,j) to black
ELSE set Fin(i,j) to white.
```

In a third example embodiment, one or more computer-readable media have computer-readable instructions thereon which, when executed, implement the method for thresholding a gray-scale image to produce a bitonal image discussed above in connection with the first example embodiment.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention. Example embodiments of the invention will be disclosed and explained with additional specificity and detail through the use of the accompanying drawings in which.

DETAILED DESCRIPTION OF EXAMPLE EMBODIMENTS

In general, example embodiments relate to methods for thresholding gray-scale images to produce bitonal images. Example embodiments can be used to produce bitonal images of checks that accurately separate foreground features of a check, such as handwriting and printed text, from background features of a check, such as background patterns, in order to make the foreground features of the check more readable for humans or optical character recognition (OCR) techniques. Example embodiments produce bitonal images using, among other techniques, global thresholding combined with local thresholding, thus combining the strengths of local thresholding with the increased information and speed of global thresholding. Edge detection may also be applied to avoid certain drawbacks of global thresholding.

Figure 1:
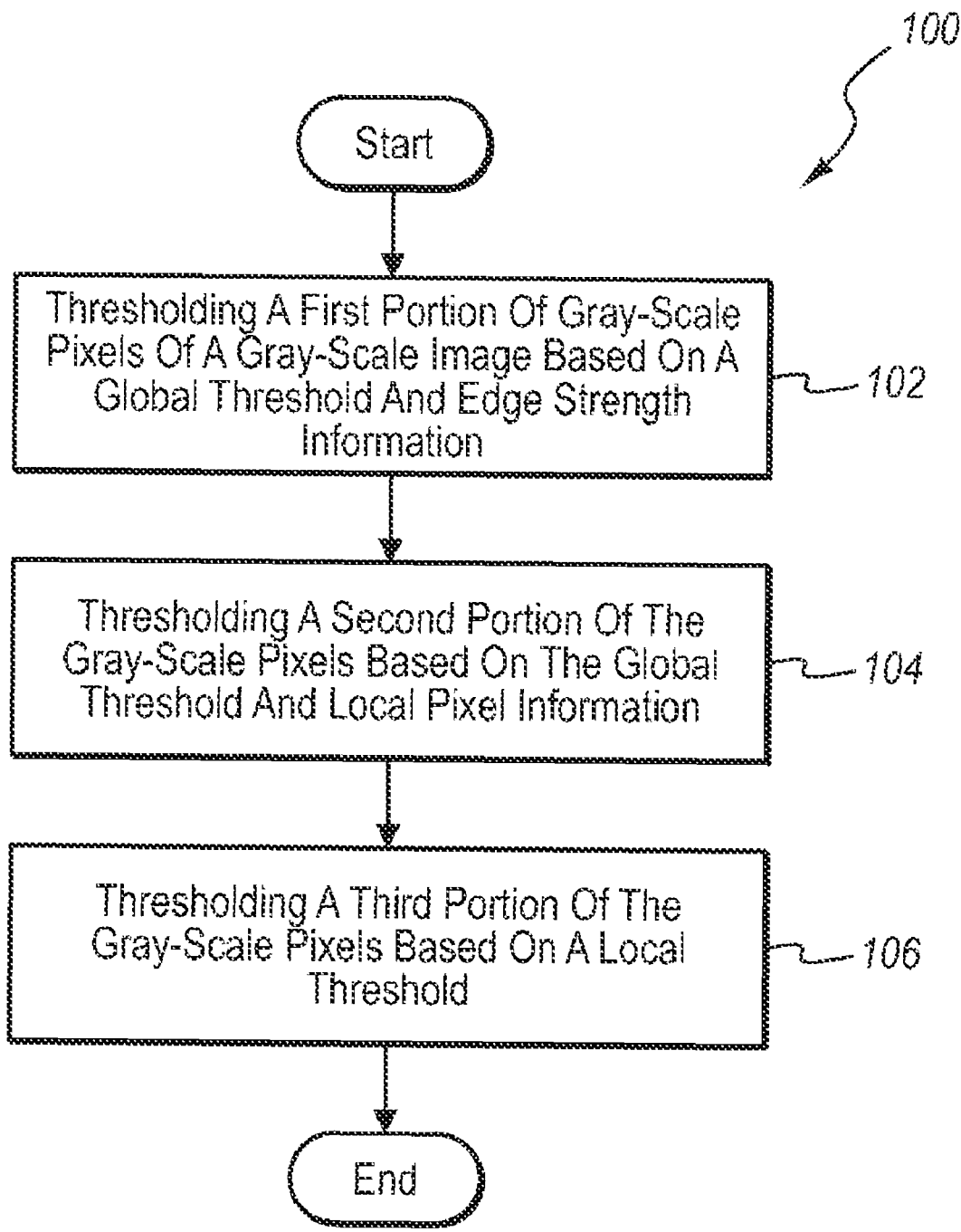
FIG. 1 discloses an example method for thresholding a gray-scale image to produce a bitonal image.

With reference now to FIG. 1, an example method 100 for thresholding a gray-scale image to produce a bitonal image is disclosed. More particularly, the example method 100 converts each gray-scale pixel of an input gray-scale image to either a black pixel or a white pixel of an output bitonal image.

The example method 100 and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, check scanners (example of which include, but are not limited to, the Epson CaptureOne™ Check Scanner and the Epson TM-S1000 manufactured by Seiko Epson Corporation), copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/check scanner combination (examples of which include, but are not limited to, the Epson TM-J9000, TM-J9100, TM-J7000, TM-J7100, and TM-H6000III, all manufactured by Seiko Epson Corporation) or a digital camera/camcorder combination. An image processing device may include thresholding capability, for example, to automatically threshold a gray-scale image to produce a bitonal image. For example, a check scanner with this automatic thresholding capability may include one or more computer-readable media that implement the example method 100, or a computer connected to the check scanner may include one or more computer-readable media that implement the example method 100.

Figure 2:
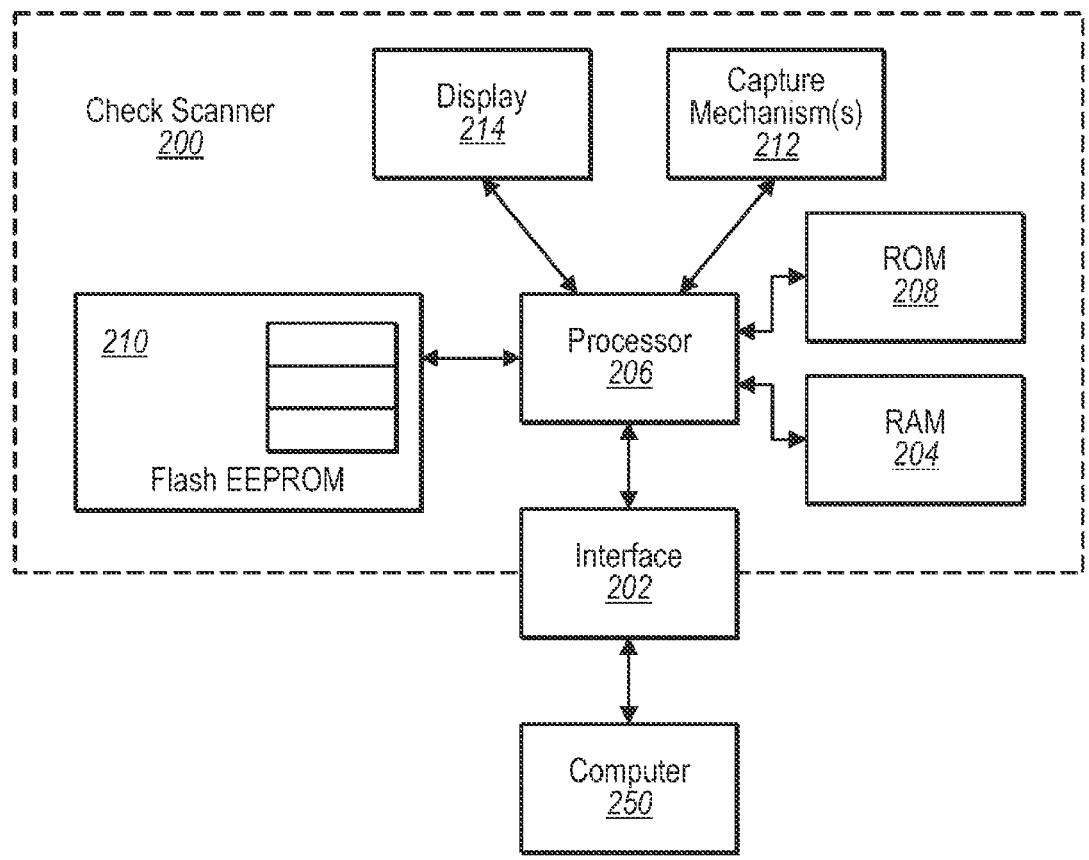
FIG. 2 is a schematic representation of an example check scanner.

A schematic representation of an example check scanner 200 is disclosed in FIG. 2. The example check scanner 200 exchanges data with a host computer 250 by way of an intervening interface 202. Application programs and a check scanner driver may also be stored for access on the host computer 250. When an image retrieve command is received from the application program, for example, the scanner driver controls conversion of the command data to a format suitable for the check scanner 200 and sends the converted command data to the check scanner 200. The driver also receives and interprets various signals and data from the check scanner 200, and provides necessary information to the user by way of the host computer 250.

When data is sent by the host computer 250, the interface 202 receives the data and stores it in a receive buffer forming part of a RAM 204. The RAM 204 can be divided into a number of sections, for example through addressing, and allocated as different buffers, such as a receive buffer or a send buffer. Data, such as digital image data, can also be obtained by the check scanner 200 from the capture mechanism(s) 212. For example, the capture mechanism(s) 212 can generate a gray-scale digital photographic image of a paper check. This digital image can then be stored in the receive buffer or the send buffer of the RAM 204.

A processor 206 uses computer-executable instructions stored on a ROM 208 or on a flash EEPROM 210, for example, to perform a certain function or group of functions, such as the method 100 for example. Where the data in the receive buffer of the RAM 204 is a gray-scale digital image, for example, the processor 206 can implement the methodological acts on the gray-scale digital image of the method 100 to automatically threshold the gray-scale digital image to produce a bitonal digital image. Further processing in an imaging pipeline may then be performed on the thresholded bitonal digital image before the bitonal digital image is displayed by the check scanner 200 on a display 214, such as an LCD display for example, or transferred to the host computer 250, for example.

It is understood that gray-scale digital images may be received by the check scanner 200 from sources other than the computer 250 and the capture mechanism(s) 212, including, but not limited to, the flash EEPROM 210 or the ROM 208. Example embodiments of the check scanner 200 include, but are not limited to, the Epson CaptureOne™ Check Scanner or the Epson TM-S1000, TM-J9000, TM-J9100, TM-J7000, TM-J7100, or TM-H6000III, all manufactured by Seiko Epson Corporation.

The example method 100 for thresholding a gray-scale image to produce a bitonal image will now be discussed in connection with FIG. 1. Prior to performing the method 100, a gray-scale digital image made up of gray-scale pixels can be targeted for various image processing operations such as thresholding.

For example, operating on gray-scale data, the example method 100 transforms an input gray-scale image X with $K_1$ rows and $K_2$ columns to an output bitonal image Y of the same dimensions. Thus, each gray-scale pixel $x_{(i,j)}$ in the image X, where $i=1, 2, \ldots, K_1$ and $j=1, 2, \ldots, K_2$ denote, respectively, the image row and column, is transformed into a bitonal pixel $y_{(i,j)}$ in the image Y.

At 102, an act of thresholding a first portion of gray-scale pixels of a gray-scale image based on a global threshold and edge strength information is performed. The act 102 can be performed, for example, by first accessing a gray-scale input image X. The gray-scale input image X can have an original intensity function, $Orig(i,j)$, which defines pixel intensities at every coordinate combination, $(i,j)$, of the gray-scale input image X. Next, edge detection can be applied to the original image intensity function, $Orig(i,j)$, to produce an edge strength function, $E(i,j)$. The edge detection may be applied using a Sobel edge detector, for example. Then, a mean, Em, of the edge strength function, $E(i,j)$, can be calculated. Next, gray-scale pixels whose edge strength is lower than the mean, Em, can be adaptively smoothed to generate a smoothed image intensity function, $Smth(i,j)$. Then, a global threshold, Gt, of the smoothed gray-scale image may be calculated. The global threshold, Gt, may be calculated using an Otsu thresholding technique, for example. Finally, a final pixel intensity, $Fin(i,j)$, of a first portion of the gray-scale pixels of the gray-scale input image X can be determined by applying the following formula:

IF $Smth(i,j) > Gt$ AND $E(i,j) < Em$

THEN set $Fin(i,j)$ to white    (1)

Next, at 104, an act of thresholding a second portion of the gray-scale pixels based on the global threshold and local pixel information is performed. The act 104 can be performed, for example, by first dividing the gray-scale input image X into a set of windows. The set of windows may include square windows, or rectangular windows, for example. Then, for each window in the set of windows, an intensity mean, Lm, and an intensity variance, Std, can be calculated.

In some example embodiments, the intensity mean, Lm, can be calculated according to the following formula:

$$Lm = IP(i+w/2, j+h/2) - IP(i+w/2, j) - IP(i, j+h/2) + IP(i-w/2, j-h/2) \quad (2)$$

where w is the width of the window, h is the height of the window, and IP(i,j) is the value of (i,j) in an integral image of the gray-scale input image X. Similarly, in some example embodiments, the intensity variance, Std, can be calculated according to the following formula:

$$Sip = SIP(i+w/2, j+h/2) - SIP(i+w/2, j) - SIP(i, j+h/2) + SIP(i-w/2, j-h/2)$$

$$Std = \mathrm{sqrt}(|Sip - Lm*Lm*w*h|)/(w/h) \quad (3)$$

where w is the width of the window, h is the height of the window, and SIP(i,j) is the value of (i,j) in a square integral image of the gray-scale input image X. Finally, the final pixel intensity, Fin(i,j), of a second portion of the gray-scale pixels of the gray-scale input image X can be determined by applying the following formula:

ELSE IF $Lm < 0.4*Gt$

THEN set Fin(i,j) to black    (4)

Next, at 106, an act of thresholding a third portion of the gray-scale pixels based on a local threshold is performed. The act 106 can be performed, for example, by determining the final pixel intensity, Fin(i,j), of a third portion of the gray-scale pixels of the gray-scale input image X by applying the following formula:

ELSE IF $Smth(i,j) < m*(Std*0.006 + 0.8)$

THEN set Fin(i,j) to black

ELSE set Fin(i,j) to white.    (5)

It is noted that the parameters used in formulas (4) and (5), namely, 0.4, 0.006, and 0.8, may be adjusted to account for various preferences or other variables, such as local window size and characteristics of the input gray-scale input image X. It is also noted that formula (5) implements a Sauvola adaptive threshold, described in Sauvola, J. and Pietikainen, M., "Adaptive Document Image Binarization," Pattern Recognition v33 (2000), which is incorporated herein by reference in its entirety. It is noted, however, that other local thresholding techniques may instead be employed.

Figure 3A:
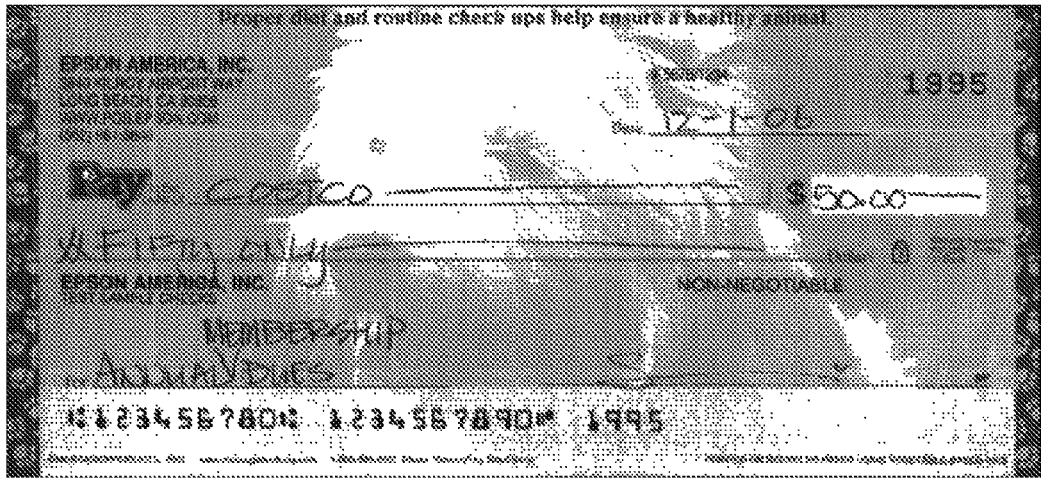
FIG. 3A is a gray-scale image of an example check.
Figure 3B:
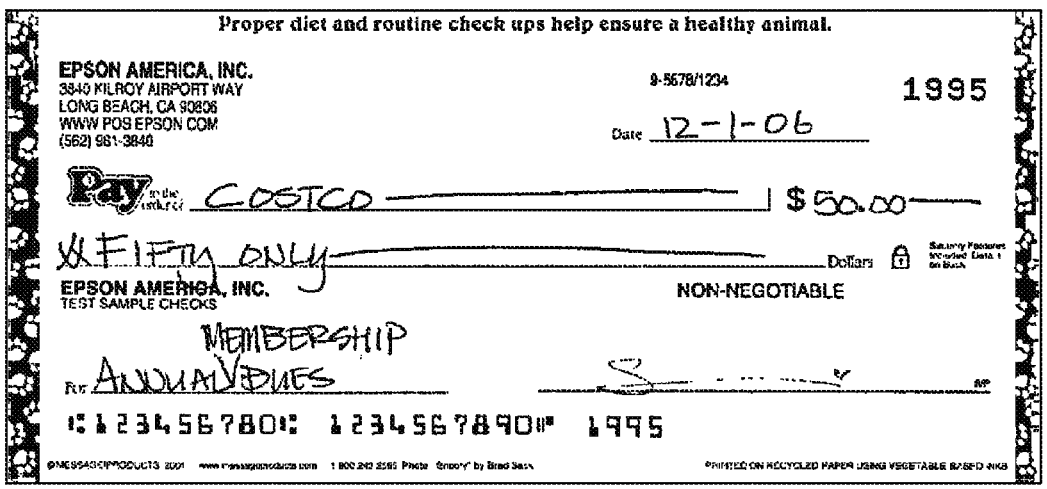
FIG. 3B is a bitonal image of the example check of FIG. 3A produced using the example method of FIG. 1.

The example method 100 for thresholding a gray-scale image to produce a bitonal image can be used to produce bitonal images of checks. FIG. 3A is a gray-scale image of an example check. FIG. 3B is a bitonal image of the example check of FIG. 3A produced using the example method 100 of FIG. 1. As disclosed in FIG. 3B, performing the method 100 on the gray-scale image of FIG. 3A accurately separates foreground features of the check, such as handwriting and printed text, from background features of the check, such as background patterns, in order to make the foreground features of the check more readable for humans or optical character recognition (OCR) techniques.

The example embodiments disclosed herein may be embodied in other specific forms. The example embodiments disclosed herein are to be considered in all respects only as illustrative and not restrictive.

What is claimed is:

1. A method for thresholding a gray-scale image to produce a bitonal image, the method comprising the acts of:
    thresholding a first portion of gray-scale pixels of the gray-scale image based on a global threshold and edge strength information;
    thresholding a second portion of the gray-scale pixels based on the global threshold and local pixel information; and
    thresholding a third portion of the gray-scale pixels based on a local threshold,
    wherein the act of thresholding the gray-scale pixels of the gray-scale image based on a global threshold and edge strength information comprises the act of converting each gray-scale pixel of the gray-scale image to a white pixel if the gray-scale pixel is lighter than a global threshold and is not located within a predetermined distance from a detected edge of the gray-scale image.

2. The method as recited in claim 1, wherein the act of thresholding a second portion of the gray-scale pixels based on the global threshold and local pixel information comprises the act of converting each unconverted gray-scale pixel to a black pixel if the gray-scale pixel is located in a window that is significantly darker on average than the global threshold.

3. The method as recited in claim 2, wherein the act of thresholding a third portion of the gray-scale pixels based on a local threshold comprises the acts of:
    converting each unconverted gray-scale pixel to a black pixel if the gray-scale pixel is greater than a local threshold corresponding to the window in which the pixel is located; and
    converting each remaining unconverted gray-scale pixel to a white pixel.

4. The method as recited in claim 3, wherein the act of converting each gray-scale pixel of the gray-scale image to a white pixel if the gray-scale pixel is lighter than a global threshold and is not located within a predetermined distance from a detected edge of the gray-scale image comprises the acts of:
    applying edge detection using a Sobel edge detector to each gray-scale pixel to produce an edge strength function;
    calculating the mean of the edge strength function;
    adaptively smoothing gray-scale pixels whose edge strength is lower than the mean to generate a smoothed image intensity function;
    calculating a global threshold of the smoothed image using an Otsu thresholding technique; and
    converting each gray-scale pixel of the gray-scale image to a white pixel if the smoothed intensity function of the gray-scale pixel is greater than the global threshold and if the edge strength function is less than the mean.

5. The method as recited in claim 4, wherein the act of converting each unconverted gray-scale pixel to a black pixel if the gray-scale pixel is located in a window that is significantly darker on average than the global threshold comprises the acts of:
    dividing the gray-scale image into a set of windows;
    calculating, for each window in the set of windows, an intensity mean, and an intensity variance; and converting each gray-scale pixel of the gray-scale image to a black pixel if the intensity mean of the window in which the gray-scale pixel is less than the global threshold times a first factor.

6. The method as recited in claim 5, wherein the first factor is about 0.4.

7. The method as recited in claim 5, wherein the act of converting each unconverted gray-scale pixel to a black pixel if the gray-scale pixel is greater than a local threshold corresponding to the window in which the pixel is located comprises the act of converting each unconverted gray-scale pixel of the gray-scale image to a black pixel if the smoothed intensity function of the gray-scale pixel is less than the intensity mean times a function of the intensity variance.

8. The method as recited in claim 7, wherein the function of the intensity variance is the intensity variance times about 0.006 plus about 0.8.

9. A method for thresholding a gray-scale image to produce a bitonal image, the method comprising the acts of:

accessing a gray-scale image having an original intensity function, Orig(i,j), which defines pixel intensities at every coordinate combination, (i,j), of the gray-scale image;

applying edge detection to the original image intensity function, Orig(i,j), to produce an edge strength function, E(i,j);

calculating a mean, Em, of the edge strength function, E(i,j);

adaptively smoothing gray-scale pixels whose edge strength is lower than Em to generate a smoothed image intensity function, Smth(i,j);

calculating a global threshold, Gt, of the smoothed gray-scale image;

dividing the gray-scale image into a set of windows;

calculating, for each window in the set of windows, an intensity mean, Lm, and an intensity variance, Std;

determining, for each image coordinate (i,j), a final pixel intensity, Fin(i,j), by applying the following formulas:

---

IF Smth(i,j) > Gt AND E(i,j) < Em
    THEN set Fin(i,j) to white
ELSE IF Lm < 0.4 * Gt
    THEN set Fin(i,j) to black
ELSE IF Smth(i,j) < Lm * (Std * 0.006 + 0.8)
    THEN set Fin(i,j) to black
ELSE set Fin(i,j) to white.

---

10. The method as recited in claim 9, wherein the intensity mean, Lm, is calculated according to the following formula:

$Lm=IP(i+w/2,j+h/2)-IP(i+w/2,j)-IP(i,j+h/2)+IP(i-w/2,j-h/2)$ where w is the width of the window, h is th height of the window, and IP(i,j) is the value of (i,j) in an integral image of the gray-scale image.

11. The method as recited in claim 9, wherein the intensity variance, Std, is calculated according to the following formulas:

$Sip=SIP(i+w/2,j+h/2)-SIP(i+w/2,j)-SIP(i,j+h/2)+SIP(i-w/2,j-h/2)$ $Std=sqrt(|Sip-Lm*Lm*w*h|)/(w/h)$ where w is the width of the window, h is th height of the window, and SIP(i,j) is the value of (i,j) in a square integral image of the gray-scale image.

12. The method as recited in claim 9, wherein the act of applying edge detection comprises the act of applying edge detection using a Sobel edge detector.

13. The method as recited in claim 9, wherein the act of calculating a global threshold comprises the act of calculating a global threshold using an Otsu thresholding technique.

14. One or more non-transitory computer-readable media having computer-readable instructions thereon which, when executed, implement a method for thresholding a gray-scale image to produce a bitonal image, the method comprising the acts of:

thresholding a first portion of gray-scale pixels of the gray-scale image based on a global threshold and edge strength information;

thresholding a second portion of the gray-scale pixels based on the global threshold and local pixel information; and thresholding a third portion of the gray-scale pixels based on a local threshold, wherein the act of thresholding the gray-scale pixels of the gray-scale image based on a global threshold and edge strength information comprises the act of converting each gray-scale pixel of the gray-scale image to a white pixel if the gray-scale pixel is lighter than a global threshold and is not located within a predetermined distance from a detected edge of the gray-scale image.

15. The one or more computer-readable media as recited in claim 14, wherein the act of thresholding a second portion of the gray-scale pixels based on the global threshold and local pixel information comprises the act of converting each unconverted gray-scale pixel to a black pixel if the gray-scale pixel is located in a window that is significantly darker on average than the global threshold.

16. The one or more computer-readable media as recited in claim 15, wherein the act of thresholding a third portion of the gray-scale pixels based on a local threshold comprises the acts of:

converting each unconverted gray-scale pixel to a black pixel if the gray-scale pixel is greater than a local threshold corresponding to the window in which the pixel is located; and converting each remaining unconverted gray-scale pixel to a white pixel.

17. An image processing device comprising:

a processor;

a memory operatively coupled to the processor; and an image thresholding portion which executes in the processor from the memory and which, when executed by the processor, causes the image processing device to perform a method of thresholding a gray-scale image to produce a bitonal image by:

thresholding a first portion of gray-scale pixels of the gray-scale image based on a global threshold and edge strength information;

thresholding a second portion of the gray-scale pixels based on the global threshold and local pixel information; and thresholding a third portion of the gray-scale pixels based on a local threshold, wherein the act of thresholding the gray-scale pixels of the gray-scale image based on a global threshold and edge strength information comprises the act of converting each gray-scale pixel of the gray-scale image to a white pixel if the gray-scale pixel is lighter than a global threshold and is not located within a predetermined distance from a detected edge of the gray-scale image.

18. The image processing device as recited in claim 17, wherein the image processing device comprises a printer, a scanner, a check scanner, a digital camera, a digital camcorder, or a portable photo viewer, or some combination thereof.

\* \* \* \* \*